United States Patent [19]
Leffler

[11] 4,170,058
[45] Oct. 9, 1979

[54] METHOD OF ADJUSTING END PLAY

[75] Inventor: James M. Leffler, Hiram, Ohio

[73] Assignee: Reliance Electric Co., Cleveland, Ohio

[21] Appl. No.: 847,850

[22] Filed: Nov. 2, 1977

Related U.S. Application Data

[62] Division of Ser. No. 708,387, Jul. 26, 1976.

[51] Int. Cl.² .................................... H02K 15/16
[52] U.S. Cl. ............................. 29/596; 308/161; 308/163; 308/244; 310/42; 310/90
[58] Field of Search ............... 29/596, 598; 310/42, 310/90, 91; 308/244, 161, 163, 135, 239, 241

[56] References Cited
U.S. PATENT DOCUMENTS

| | | | |
|---|---|---|---|
| 1,032,159 | 7/1912 | Price | 308/244 |
| 2,539,079 | 1/1951 | Wightman | 308/161 |
| 3,441,325 | 4/1969 | Sjøtun | 308/161 |

*Primary Examiner*—Carl E. Hall

*Attorney, Agent, or Firm*—Pearne, Gordon, Sessions, McCoy & Granger

[57] ABSTRACT

The axial end play of dynamoelectric machine may be adjusted by adjusting the axial position of a machine bearing relative to the machine rotor. A relatively large electric motor is illustrated wherein the amount and position of the axial end play of the rotor may be adjusted without disassembly of the motor. A bearing cap at one or both ends of the motor is removed to observe the amount of axial clearance between the bearing and a shoulder on either the stator or the rotor, the shaft is lifted slightly, the bearing is moved in the frame, an arcuate shim is inserted between the bearing and a shoulder in the frame, the upper bearing half is replaced if it is a split bearing and then the bearing cap is replaced and secured to secure the bearing in its newly located axial position. The foregoing abstract is merely a resume of one general application, is not a complete discussion of all principles of operation or applications, and is not to be construed as a limitation on the scope of the claimed subject matter.

14 Claims, 8 Drawing Figures

METHOD OF ADJUSTING END PLAY

This is a division of application Ser. No. 708,387 filed July 26, 1976.

BACKGROUND OF THE INVENTION

In the assembly of machines having a rotor rotatable relative to a stator, it is necessary to axially locate the rotor relative to the stator. In large dynamoelectric machines such as generators and motors, many parts must be assembled and the cumulative tolerance of errors makes the assembly difficult so as to have the rotor in proper position relative to the stator. These cumulative tolerances may include as many as fifteen or more tolerances which easily can be cumulative to the point that the rotor is out of proper position upon assembly. Additionally, in dynamoelectric machines there is a solenoid effect wherein even if the rotor were mechanically centered within the stator, there could still be a difference between the mechanical center position of the rotor and the magnetic center. This can be due to differences in air gap along the length of the rotor and can be due to manufacturing tolerances in the magnetic assembly of the rotor and stator. Accordingly, the machine must be electromagnetically operated in order to determine if the magnetic center is axially displaced from the mechanical center. These two main problems mean that in many cases a dynamoelectric machine, once having been assembled, is found to have an improper end play, that is, an improper clearance between the bearing and the rotor. Generally the machine is one having two bearings, one at each end. In a machine not designed for resisting an axial thrust and thus having only radial bearings, there is usually a small amount of clearance between a shaft shoulder and a bearing shoulder at each of the two bearings. Now if, due to cumulative tolerances or due to the magnetic center not coinciding with the mechanical center, the rotor and shaft assembly is displaced axially, then there is an improperly small clearance between the bearing and shaft shoulders at one end and an improperly large clearance at the other end of the machine.

Many dynamoelectric machines comprise a stack of rotor laminations on a shaft and comprise a stack of stator laminations in the frame. To attempt to achieve proper centering of the rotor shaft assembly in the bearings, the prior art often tried to move the stator within the frame but this was difficult in view of the usual press fit. Other prior attempts included trying to move the rotor laminations on the shaft but this was also difficult because of either a press fit or a shrink fit. Also either of these two methods of relocating meant that the entire dynamoelectric machine had to be disassembled in order to use a press on the stator or the rotor laminations.

Still other prior art attempts at locating the rotor and shaft assembly provided washer like shims on the shaft between the rotor or shaft shoulder and the inner end of the bearing in the frame. However, use of such washer like shims also meant that the dynamoelectric machine had to be disassembled in order to apply shims at one end and remove them from the other end. Another prior art attempt at axial end play adjustment was to force a thrust bearing unit into a cup shaped spacer with both being on the shaft between the rotor and the inner end of the bearing. However in this method there was no way nor any attempt to change the axial spacing once these two parts had initially been assembled.

Accordingly an object of the invention is to provide an axial adjustment to the rotor of a machine which obviates the above-mentioned disadvantages.

Another object of the invention is to provide axial adjustment to the rotor of a machine wherein there is relative axial positioning between a bearing and one of the rotor and stator.

Another object of the invention is to provide a method of adjusting the axial end play of a dynamoelectric machine without disassembly of the rotor from the stator.

Another object of the invention is to provide a means to locate a bearing relative to the frame of a rotating machine and then a means to secure the bearing and locator means in place.

The invention may be incorporated in the method of adjusting the axial end-play of a shaft-mounted rotor and a stator in a dynamoelectric machine having the stator in a frame receiving a bearing, said method comprising the steps of, providing in the frame bearing receiving means of an axial length to receive the bearing, assembling the machine and running the machine to cause the rotor and shaft assembly to have any axial shift due to magnetic action with the stator, stopping the machine, and relatively axially locating the bearing and one of the rotor and stator.

Other objects and a fuller understanding of the invention may be had by referring to the following description and claims, taken in conjunction with the accompanying drawing.

DESCRIPTION OF THE PREFERRED EMBODIMENT

Figure 1:
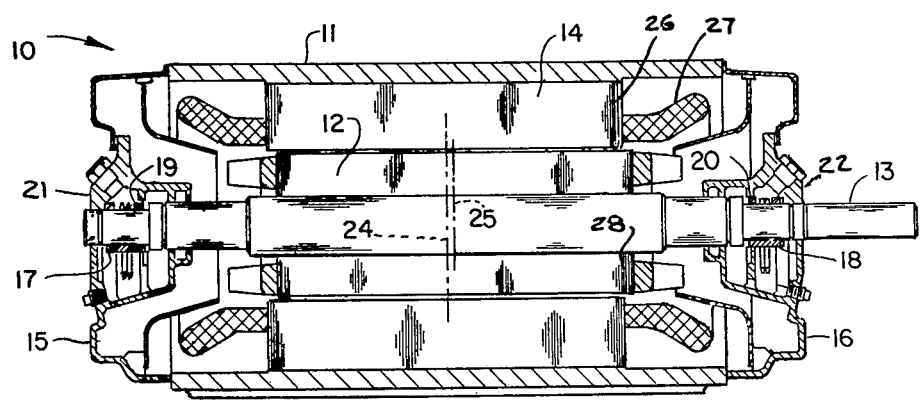
FIG. 1 is longitudinal sectional view through a machine incorporating the invention.

FIG. 1 is a somewhat simplified longitudinal sectional view of a machine 10 having a frame 11 and a rotor 12 rotatable relative thereto. The rotor 12 is fixed on a shaft 13 for a rotor shaft assembly. The machine 10 may be many different types and the types illustrated is a dynamoelectric machine wherein the rotor 12 magnetically cooperates with a magnetic stator 14 carried in the frame 11. A part of the frame includes end brackets 15 and 16 with these end brackets sometimes being called end bells. Bearing receiving means 17 and 18 are provided in the end brackets 15 and 16, respectively, to receive bearings 19 and 20, respectively. The bearings 19 and 20 may be of many types such as thrust bearings or as shown here radial bearings, and may also be ball bearing or roller bearing types, but as shown here may be sleeve bearings.

The end brackets 15 and 16 may be of the completely enclosing type or as shown may be generally only on the lower half of the machine with bearing caps 21 and 22 securable to the end brackets to secure in place the bearings 19 and 20, respectively.

The bearings 19 and 20 are axially movable relative to one of the rotor 12 and stator 14 and in this preferred embodiment are movable relative to the stator 14. To this end the bearing receiving means 17 and 18 are machined to a depth or axial length greater than that of the respective bearing. This permits axial movement of the bearings 19 or 20 or both to adjust the end play of the rotor shaft assembly 12, 13. As shown in FIG. 1, the mechanical center axially along the shaft 13 of the stator 14 may be at a line 24 perpendicular to the shaft 13. The rotor 12 is shown axially displaced to the right a small amount so that the mechanical center thereof is illustrated as being along a line 25 perpendicular to the shaft 13. Upon electromagnetically operating the machine 10 it may be found that the rotor 12 is displaced to the right as shown in FIG. 1 so that the lines 24 and 25 are not coincident with each other. This could be caused by the magnetic center of the rotor 12 not agreeing with the mechanical center 24 of the stator. There is a solenoid effect attempting to pull the rotor 12 axially into a position of maximum flux density and this can be affected by variations in the air gap or variations in the permeability along the length of the rotor or stator.

Figure 4:
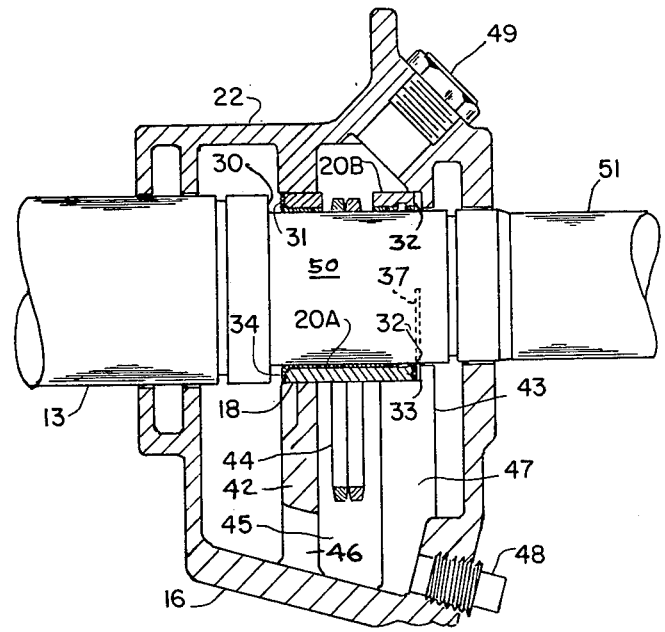
FIG. 4 is an enlarged partial longitudinal sectional view of part of a machine incorporating the invention.

FIGS. 1 and 4 show in some detail the physical construction of a typical dynamoelectric machne. The frame 11 may have press fitted into it a group of stator laminations 26 which form the stator 14. Windings 27 may extend through slots in the stator 14 to energize the stator. The rotor 12 likewise may be formed of a group 28 of rotor laminations which are press fitted or shrink fitted onto the shaft 13.

The two ends of the machine may be generally identical insofar as the present invention is concerned, so only one end will be described in detail, as shown in FIGS. 4–8.

Figure 2:
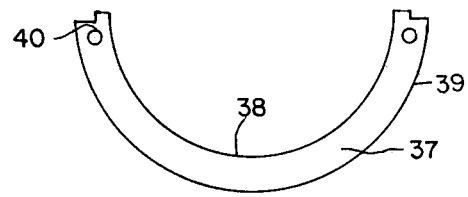
FIG. 2 is an enlarged front view of a shim used in the invention.
Figure 3:
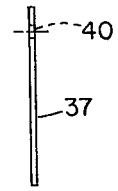
FIG. 3 is a side view of the shim of FIG. 2.

The shaft 13 may have a thrust shoulder 30 adjacent to an inwardly facing first shoulder 31 on the bearing 20. The bearing 20 also has an outwardly facing or second shoulder 32. This shoulder 32 may be adjacent and cooperate with a receiver shoulder 33 in the bearing receiving means 18. In this embodiment the bearing 20 is a sleeve bearing which may be bronze for example with a layer of bearing metal such as babbitt metal 34. This babbitt extends around and covers the first shoulder 31. In a machine designed for radial bearing service only, this shoulder 31 is not designed to rub on the thrust shoulder 30 but instead is designed to be spaced therefrom for example by 0.050 inches or perhaps 0.250 inches in large machines. To achieve the proper design clearance between the shoulders 30 and 31 one or more shims 37 may be provided between the shoulders 32 and 33. These shims 37 may be part of locator to locate the axial position of the bearing relative to one of the rotor and stator, and in this preferred embodiment locate the bearing relative to the stator 14 and relative to the frame 11. The shim 37 is better shown in FIGS. 2 and 3 and may be arcuate in shape. Each shim is a semi-ring with the inner surface 38 thereof being a semi-circular surface not exceeding 180° of arc. The outer surface 39 thereof is of a radial dimension to fit within the bearing receiving means 18. The shim 37 may have an aperture 40 to receive a tool to manipulate the shim 37.

The bearng receiving means 18 provides support for the bearing 20 to carry the weight of the rotor shaft assembly 12, 13 and this may include machined surfaces in walls 42 and 43. In the preferred embodiment the sleeve bearing 20 is not grease lubricated rather it is oil lubricated by oil rings 44 dipping into an oil reservoir 45 formed in the end bracket. The wall 42 may have an aperture 46 for oil passage and the wall 43 may have a vertical slot 47 again for passage of oil to a drain plug 48. An oil filler plug 49 provides access to the reservoir 45. The shaft 13 has a journal portion 50 cooperating with the bearing 20 and has extension 51 for connection to the driven load. As an example, this may be a coupling which has limited axial float. This is another reason why the axial end play of the machine 10 should be controlled in amount and position.

Figure 5:
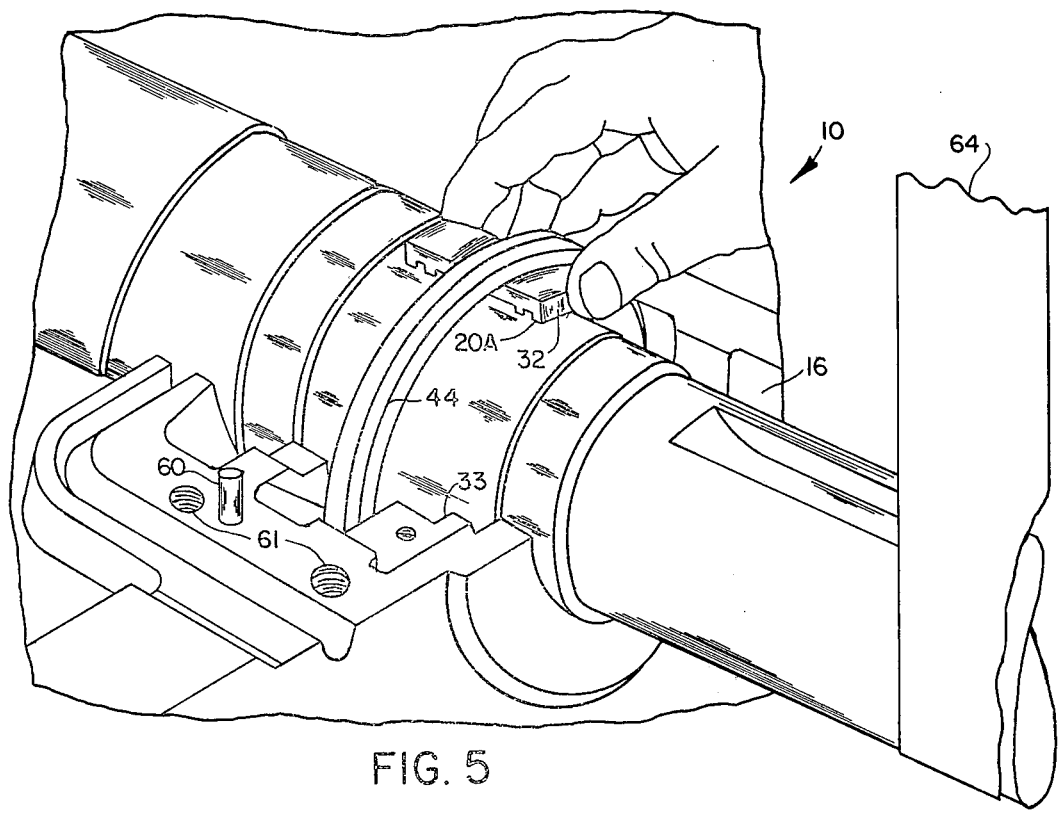
FIGS. 5, 6, 7 and 8 are perspective partial views of a machine illustrating the sequence of the axial adjustment of a machine.
Figure 6:
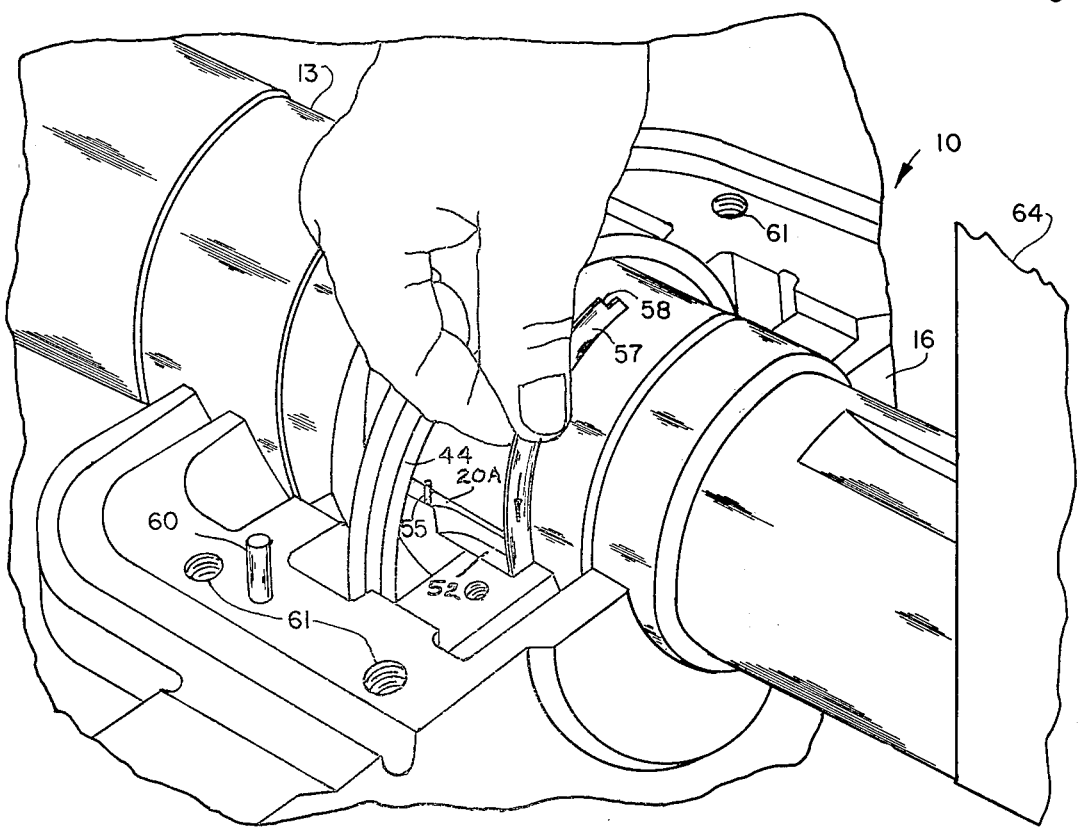
Figure 7:
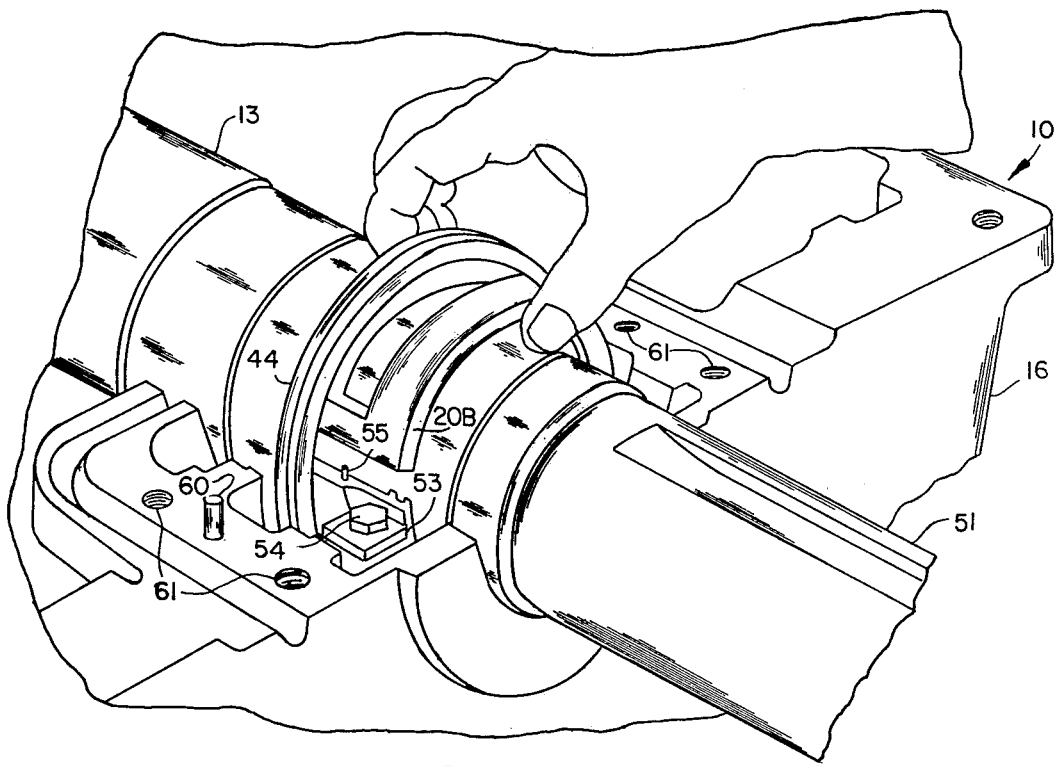

FIGS. 5–8 show additional details of the machine 10 of the preferred embodiment. The bearing 20 is a split bearing comprising a lower bearing half 20A and an upper bearing half 20B. The lower bearing half 20A has securing keyways 52 approximately diametrically opposite each other and two securing plates 53 are held in place by cap screws 54, with the two plates 53 being on opposite sides of the shaft 13 to secure the lower bearing half 20A in place. This is shown in FIG. 7. A small dowel pin 55 is provided in each of the two ends of the lower bearing half 20A to be received in locator apertures, not shown, in the upper bearing half 20B. A shim 57 or a plurality of shims 57 may be used in the semi-cylindrical space between the bearing shoulder 32 and the receiver shoulder 33. The securing plates hold the shims in place so that they do not rotate with the shaft 13. The bearing cap 22 is accurately located by dowel pins 60, one on either side of the shaft 13 and is secured to the end bracket 16 by cap screws, not shown, extending into threaded apertures 61 in the end bracket 16.

Operation

The machine 10 is shown as dynamoelectric machine and is representative of many different types of machines which have the problem of properly axially locating the rotor relative to the stator. Especially in the larger sizes these machines have many parts which must be interconnected and the cumulative tolerance of errors makes the precise positioning of the rotor 12 relative to the stator 14 a matter of considerable difficulty.

The proper axial positioning of the rotor relative to the stator is a problem compounded by the larger frame sizes of dynamoelectric machine, e.g. those 24" in diameter and larger. There are many manufacturing tolerances which combine cumulatively toward causing a misalignment between the axial position of the rotor and the stator. These many places of possibly cumulative manufacturing tolerances are:

1. The length of the shaft 13 to the thrust shoulder 30 on the shaft.
2. The length from the end of the shaft 13.
3. The length of the shaft to the end of the keyway for the rotor laminations.
4. The thickness of the rotor laminations 28.
5. The thickness of the rotor laminations 28 as insulated.
6. The counted number of the rotor laminations 28.
7. The actual stacked length of the rotor laminations.
8. The shrink fit position of the rotor lamination stack 12 on the shaft 13.
9. The thickness of the stator laminations 26.
10. The thickness of the stator laminations 26 as insulated.
11. The counted number of stator laminations.
12. The actual stacked length of the stator laminations.
13. The press fitted position of the stator lamination stack 14 in the frame 11.

14. The axial dimension from the end of the frame to the machined shoulder 33 in the frame for the bearing 20.

15. The length of the bearing 20.

All of these manufacturing tolerances can and do affect the assembled position of the rotor and stator. This is not determined until final assembly of the machine. Further, when the machine is operated, the magnetic solenoid effect will pull the rotor axially in one direction so that the magnetic center thereof is attempted to be aligned with the magnetic center of the stator. These two magnetic centers can be affected by the air-gap along the length of the rotor and the magnetic flux density along the air-gap. When the machine is inspected during operation, e.g. by removing a bearing cap 22, one may notice that the first end 31 of the bearing is much closer to the shaft thrust shoulder 30 at one end of the machine than at the other. This is the reason for requiring repositioning of the bearing 20 relative to the rotor 12 or to be able to effect the adjusted position of the rotor and shaft assembly. If one tries to move the stator magnetic stack 14 relative to the frame, this requires disassembly of the machine and would also require considerable force judiciously exercised because of the press fit. If one attempts to move the shrink fitted rotor lamination stack 12 on the shaft 13, this not only requires disassembly of the machine, but is very difficult to do and may result in a bent shaft.

Figure 8:
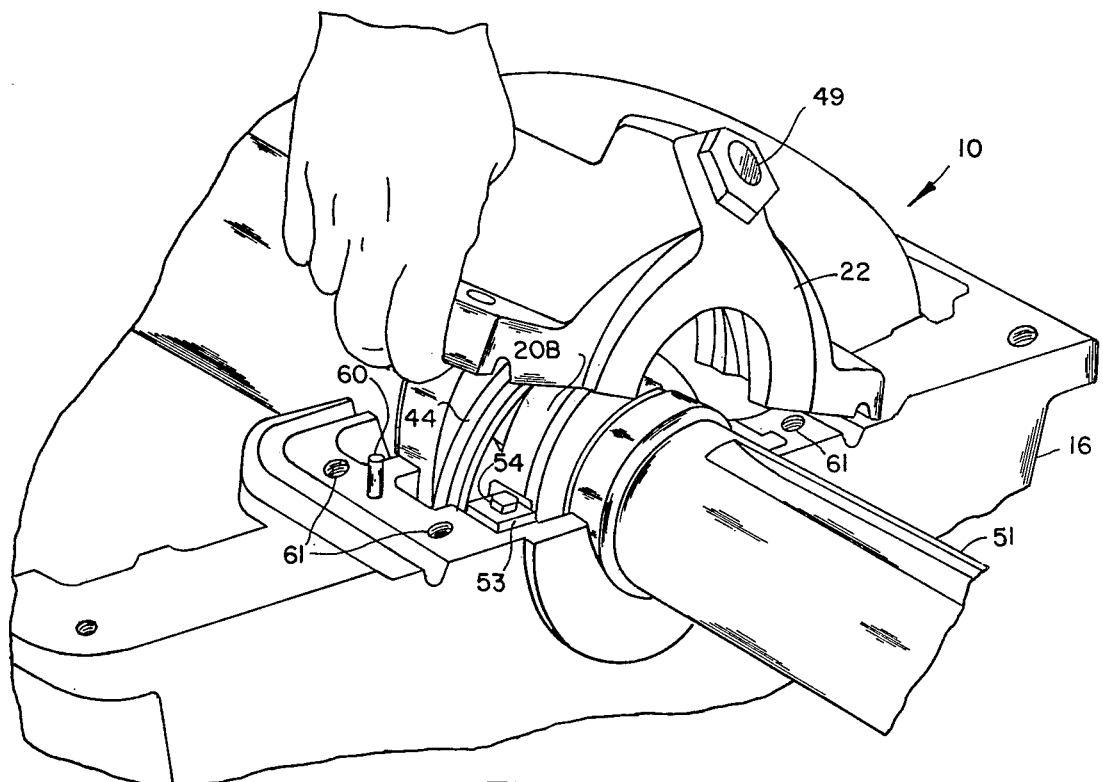

FIGS. 5-8 show the sequence of operations for initial assembly or for repositioning of the bearing 20 relative to the frame 11. These FIGS. 5-8 show the bearing 20 at only one end of the machine but the construction of the other end of the machine may be essentially the same. Initially two shims 57 may be inserted at each end of the machine between the bearing shoulder 32 and receiver shoulder 33. The machine is then completed in assembly and is electrically energized to be operated to rotate the rotor. Any solenoid effect will then move the rotor and shaft assembly 12, 13 so that the magnetic center of the rotor 12 and stator 14 are aligned. Due to tolerance in the mechanical construction and tolerances in the magnetic path, this may result in the mechanical center of the stator 24 being displaced from the mechanical center 25 of the rotor 12, as illustrated in FIG. 1. In this illustration, with the rotor and shaft assembly 12, 13 displaced toward the end bracket 16, one would find that the shaft thrust shoulder 30 was very closely adjacent the bearing first end shoulder 31. This would be observable upon removing the cap screws and removing the bearing cap 22. If the axial position of the rotor and shaft assembly is outside of the specification limits, then the bearing caps at both ends of the machine would be removed, as illustrated in FIG. 8. Next the upper bearing halves 20B would be removed as in FIG. 7. The securing plates 53 are next removed to expose the shims 57. One or more shims would be removed as necessary from that end of the machine at which the smallest clearance exists between the shaft thrust shoulder 30 and the bearing first shoulder 31. One or more shims would be inserted at the other end of the machine, as shown in FIG. 6. These shims are placed between the bearing second shoulder 32 and the receiver shoulder 33 in the end bracket. The shims are semi-ring shaped and may be placed on the shaft with the concave inner surface facing downwardly and then the shim rotated along its peripheral length into the semi-cylindrical space adjacent the lower bearing half 20A. In order to permit the insertion of this shim 57 and hence the slight axial movement of the lower bearing half 20A, the shaft and rotor assembly 12, 13 may be lifted slightly as by a belt 64. The slight axial movement of bearing half 20A moves axially both bearing shoulders 31 and 32 simultaneously. The air gap between the rotor 12 and stator 14 permits this slight lifting to relieve the weight of the rotor and shaft assembly from the lower bearing half 20A. If the lower bearing half 20A needs to be removed or, for example, during initial assembly, this bearing half may be rotated about 180° as illustrated in FIG. 5 to lie on top of the shaft and thus it may be removed from underneath the oil rings 44.

When the proper number of shims 57 are inserted at the two ends of the machine for the proper clearance between shaft shoulder 30 and bearing shoulder 31, then the above process may be reversed. The securing plate 53 is put in position against the securing keyway 52 and against the shim securing shoulder 58 and held by a cap screw 54. Two of the securing plates on each side of the shaft establish that the lower bearing half 20A is secured in position and also assures that the shims 57 are secured against rotation. Other means may be employed to secure the bearing half 20A. For example, the bearing halves 20A and B may be made from bronze and have a slight interference fit in the support walls 42 and 43. This will slightly crush the semi-cylindrical bearing halves diametrically inwardly and when the entire assembly is completed namely with the bearing cap 22 in place, this will efficiently secure bearing 20 in place so that it can neither move axially nor rotatively around the shaft.

To complete the assembly, the oil rings 44 are lifted and the upper bearing half 20B is slid underneath them and then lowered into position as controlled by the dowel pins 55. Shims may be used between the upper bearing half and the second end of the upper bearing half 20A, but in the preferred embodiment shims are used only against the lower bearing half 20A and the upper bearing half 20B is located by the dowel pins 55. The bearing cap 22 may next be placed in position and held by cap screws in the threaded apertures 61. This effectively crushes the two bearing halves in place in the bearing receiving means 18 so that the bearing cannot move axially or rotatively.

It will be noted that the machined surface in the end bracket 16 and the bearing cap 22 forming the bearing receiving means 18 has been machined to a depth greater than the axial length of the bearing 20. This permits axial movement of the bearing 20 relative to the frame 11 and relative to the shaft shoulder 30. The bearing 20 has the shoulder 32 facing outwardly relative to the rotor 12 and the shims 37 or 57 are locator means which by their variable thickness and number adjustably relatively locate the axial position of this bearing shoulder 32 and either the rotor 12 or stator 14. In the embodiment shown this relative axial positioning is with respect to the frame 11, and with respect to the end bracket 16 which is part of the frame 11.

The removable bearing cap 22 is a means providing access to the machine 10 to observe the position of the shaft shoulder 30 and bearing shoulder 31 and also to permit insertion or removal of the appropriate number of shims 37 and 57.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. The method of adjusting the axial end-play of a shaft-mounted rotor and a stator in a dynamoelectric machine having the stator in a frame receiving a bearing, said method comprising the steps of,
   providing in the frame bearing receiving means of an axial length to receive the bearing,
   assembling the machine and running the machine to cause the rotor and shaft assembly to have any axial shift due to magnetic action with the stator,
   stopping the machine, and
   relatively axially locating the bearing and one of the rotor and stator.

2. The method as set forth in claim 1 wherein said locating step includes locating with the rotor in place in the stator.

3. The method as set forth in claim 2 including raising the shaft to remove weight from the bearing prior to axially shifting the bearing.

4. The method as set forth in claim 2 including in the locating step inserting a shim between a shoulder of the bearing and a shoulder in the frame.

5. The method as set forth in claim 1 wherein the frame has an end bracket,
   providing the bearing receiving means in the end bracket,
   and the locating step including axially shifting the bearing in the end bracket.

6. The method as set forth in claim 5 including providing a bearing cap securable to the end bracket to engage the bearing,
   removing the bearing cap after stopping the machine to observe the position of the journal portion of the shaft relative to the bearing,
   raising the shaft and rotor assembly,
   said locating step including axially shifting the bearing in the end bracket,
   inserting an arcuate shim between the bearing and the bearing receiving means,
   and securing the bearing by replacing said bearing cap and securing said bearing cap to the end bracket.

7. The method as set forth in claim 1 wherein said locating step includes locating the bearing relative to the stator.

8. The method as set forth in claim 7 including securing the bearing in the axially shifted position in the frame.

9. The method as set forth in claim 8 wherein said securing step includes providing a bearing cap securable to the frame to engage the bearing.

10. The method as set forth in claim 9 wherein the bearing is a split bearing with upper and lower halves, removing the bearing cap to observe the position of the journal portion of the shaft relative to the lower bearing half,
   raising the shaft and rotor assembly,
   said locating step including axially shifting the lower bearing half in the end bracket,
   inserting a semi-circular shim between the lower bearing half and a shoulder of the bearing receiver,
   axially locating the upper bearing half in accordance with the axial position of the lower bearing half,
   and said securing step including replacing said bearing cap and securing said bearing cap to the end bracket to engage said upper bearing half.

11. A method of adjusting the axial end-play of a dynamoelectric machine having a frame with first and second bearing receiving means for receiving a first and a second bearing journaling a rotor shaft assembly, the first and second bearing receiving means enabling axial movement of the first and second bearings, comprising the steps of:
   locating the position of the rotor shaft assembly in the magnetic center of the dynamoelectric machine;
   rotating the machine under dynamoelectric conditions,
   obtaining access to at least one of said first and second bearings in the respective bearing receiving means,
   adjusting the axial location of said at least one of the first and second bearings within the first and second bearing receiving means in accordance with the position of the rotor shaft assembly; and
   securing the adjusted one of the first and second bearings relative to the frame.

12. A method of adjusting the axial end-play of a dynamoelectric machine having a frame with first and second bearing receiving means for receiving a first and a second bearing journaling a rotor shaft assembly, the first and second bearing receiving means enabling axial movement of the first and second bearings, comprising the steps of:
   locating the position of the rotor shaft assembly in the magnetic center of the dynamoelectric machine;
   adjusting the axial location of at least one of the first and second bearings within the first and second bearing receiving means in accordance with the position of the rotor shaft assembly; and
   securing the adjusted one of the first and second bearings relative to the frame.

13. A method as set forth in claim 12, wherein the step of adjusting includes inserting shims between an axial end of one of the first and second bearings and the frame.

14. A method as set forth in claim 12, wherein the step of adjusting includes inserting an end of a semi-ring shaped shim between an axial end of one of the first and second bearings and the frame; and
   rotating the shim to have a portion thereof beneath the rotor shaft of the machine.

* * * * *